United States Patent
Hoogerbrugge

(10) Patent No.: US 11,521,084 B2
(45) Date of Patent: Dec. 6, 2022

(54) ANOMALY DETECTION IN A DATA PROCESSING SYSTEM

(71) Applicant: NXP B.V., Eindhoven (NL)

(72) Inventor: Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 385 days.

(21) Appl. No.: 16/816,346

(22) Filed: Mar. 12, 2020

(65) Prior Publication Data

US 2021/0287110 A1 Sep. 16, 2021

(51) Int. Cl.
*G06N 5/04* (2006.01)
*G06N 20/10* (2019.01)

(52) U.S. Cl.
CPC .............. *G06N 5/04* (2013.01); *G06N 20/10* (2019.01)

(58) Field of Classification Search
CPC ................................. G06N 5/04; G06N 20/10
USPC ...................................................... 706/12–45
See application file for complete search history.

(56) References Cited

U.S. PATENT DOCUMENTS

| | | | | | |
|---|---|---|---|---|---|
| 6,886,008 | B2 * | 4/2005 | Blayvas | ............... | G06K 9/6298 345/428 |
| 7,565,370 | B2 * | 7/2009 | Milenova | ............... | G06F 16/285 707/999.102 |
| 7,624,274 | B1 * | 11/2009 | Alspector | ............. | H04L 51/212 713/180 |
| 7,627,543 | B2 * | 12/2009 | Lock | ...................... | G06N 5/025 706/45 |
| 7,734,627 | B1 * | 6/2010 | Tong | ..................... | G06F 16/319 707/737 |
| 8,209,271 | B1 * | 6/2012 | Lin | ......................... | G06N 20/00 706/12 |
| 8,468,104 | B1 * | 6/2013 | Chelian | ................. | G06K 9/6222 706/12 |
| 8,762,298 | B1 * | 6/2014 | Ranjan | .................. | G06F 21/552 706/12 |
| 8,793,201 | B1 * | 7/2014 | Wang | .................... | G06F 16/258 706/13 |
| 8,812,534 | B2 * | 8/2014 | Platt | ...................... | G06F 16/242 706/14 |
| 10,373,056 | B1 * | 8/2019 | Andoni | ................ | G06K 9/6271 |

(Continued)

OTHER PUBLICATIONS

Tellis et al, "Detecting Anomalies in Data Stream Using Efficient Techniques : A Review", IEEE, pp. 296-298 (Year: 2018).*

(Continued)

*Primary Examiner* — Anil Khatri
(74) *Attorney, Agent, or Firm* — Daniel D. Hill

(57) ABSTRACT

A data processing system and a method for detecting an anomaly in the data processing system are provided. The method includes receiving a plurality of program counter values from a processing core of the data processing system. Each of the plurality of program counter values corresponds to an instruction being executed in the data processing system. A histogram is constructed using the plurality of program counter values. The histogram is provided to a machine learning (ML) model and used for training the ML model. If training has already been accomplished, the histogram is provided during inference operation of the ML model. The ML model and the histogram are used to detect an anomaly in the data processing system. If an anomaly is detected, an indication of the anomaly may be provided.

16 Claims, 5 Drawing Sheets

(56) References Cited

U.S. PATENT DOCUMENTS

| | | | |
|---|---|---|---|
| 10,635,565 B2* | 4/2020 | Dang | G06K 9/6284 |
| 10,846,623 B2* | 11/2020 | Adjaoute | G06N 20/00 |
| 10,917,419 B2* | 2/2021 | Crotinger | G06F 11/3419 |
| 11,057,414 B1* | 7/2021 | Giorgio | G06F 16/9024 |
| 11,204,847 B2* | 12/2021 | Nie | G06N 20/20 |
| 11,237,939 B2* | 2/2022 | Chanda | G06F 11/3452 |
| 11,416,369 B1* | 8/2022 | Trapani | G06F 17/18 |
| 11,418,852 B2* | 8/2022 | Larson | H04N 21/235 |
| 2019/0179626 A1 | 6/2019 | Fox | |
| 2021/0385238 A1* | 12/2021 | Akella | H04L 63/1425 |

OTHER PUBLICATIONS

Eswaran et al., "Spotlight: Detecting Anomalies in Streaming Graphs", ACM, pp. 1378-1386 (Year: 2018).*

Cao et al, "Machine Learning to Detect Anomalies in Web Log Analysis", IEEE, pp. 519-523 (Year: 2017).*

Nassif et al, "Machine Learning for Anomaly Detection: A Systematic Review", IEEE, pp. 78650-78700 (Year: 2021).*

Inoue et al., "Anomaly Detection for a Water Treatment System Using Unsupervised Machine Learning", IEEE, pp. 1058-1065 (Year: 2017).*

Ochodek et al, "Using Machine Learning to Design a Flexible LOC Counter", IEEE, pp. 14-20 (Year: 2017).*

Alosno etal, "Predicting Software Anomalies using Machine Learning Techniques", IEEE, pp. 163-170 (Year: 2011).*

ARM Embedded Trace Macrocell Architecture Specification ETMv4.0 to ETMv4.2; Copyright 2012-2016; ARM IHI 0064D (ID020516); First Beta Release, Issue A, Mar. 28, 2012 and Incorporation of ETMv4.2 Architecture, Issue D, Feb. 8, 2016.

Alam, Manaar et al.; "Performance Counters to Rescue: A Machine Learning Based Safeguard Against Micro-Architectural Side-Channel-Attacks;" IACR Cryptology ePrint Archive: BibTeX Citation of Report 2017/564; Last Revised Jul. 2, 2017.

Das, Sanjeev at al.; "SoK: The Challenges, Pitfalls, and Perils of Using Hardware Performance Counters for Security;" Published in 2019 IEEE Symposium on Security and Privacy (SP), May 19-23, 2019, San Francisco, CA; DOI 10.1109/SP.2019.00021.

Garcia, Joshua et al.; "Lightweight, Obfuscation-Resilient Detection and Family Identification of Android Malware;" 2018 IEEE/ACM 40th International Conference on Software Engineering (ICSE); May 27-Jun. 3, 2018, Gothenburg, Sweden; DOI: 10.1145/3180155.3182551.

Lane, Terran; "Machine Learning Techniques for the Domain of Anomaly Detection for Computer Security;" Publication Date Jul. 16, 1998; Purdue University, Indiana, USA Journal.

Mahawer, Devendra Kumar et al.; "Metamorphic Malware Detection Using Base Malware Identification Approach;" First Published Nov. 6, 2013 at https://doi.org/10.1002/sec.869; Security and Communication Networks Journal, vol. 7, Issue 11, pp. 1719-1733; Nov. 2014.

Ozsoy, Meltem et al.; "Malware-Aware Processors: A Framework for Efficient Online Malware Detection;" Published in 2015 IEEE 21st International Symposium on High Performance Computer Architecture (HPCA), Feb. 7-11, 2015, Burlingame, California; DOI: 10.1109/HPCA.2015.7056070.

Scholkopf, Bernhard et al.; "Support Vector Method for Novelty Detection;" Published NIPS Proceedings of the 12th International Conference on Neural Information Processing Systems; Nov. 29-Dec. 4, 1999, Denver, Colorado.

Zhou, Yu-Yang; "An Efficient Network Intrusion Detection System Based on Feature Selection and Ensemble Classifier;" arXiv.org > cs > arXiv:1904.01352; Submitted Apr. 2, 2019; Last Revised Sep. 19, 2019.

* cited by examiner

ANOMALY DETECTION IN A DATA PROCESSING SYSTEM

BACKGROUND

Field

This disclosure relates generally to data processing, and more particularly, to detecting anomalies in a data processing system.

Related Art

Machine learning is becoming more widely used in many of today's applications. For example, a machine learning (ML) model can be used to make predictions about different types of phenomena, classify images, detect objects in video streams, and to predict the weather. An ML model can also help to detect anomalies in both hardware and software of the data processing system. The anomalies can be caused by a malfunction or by an attacker.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
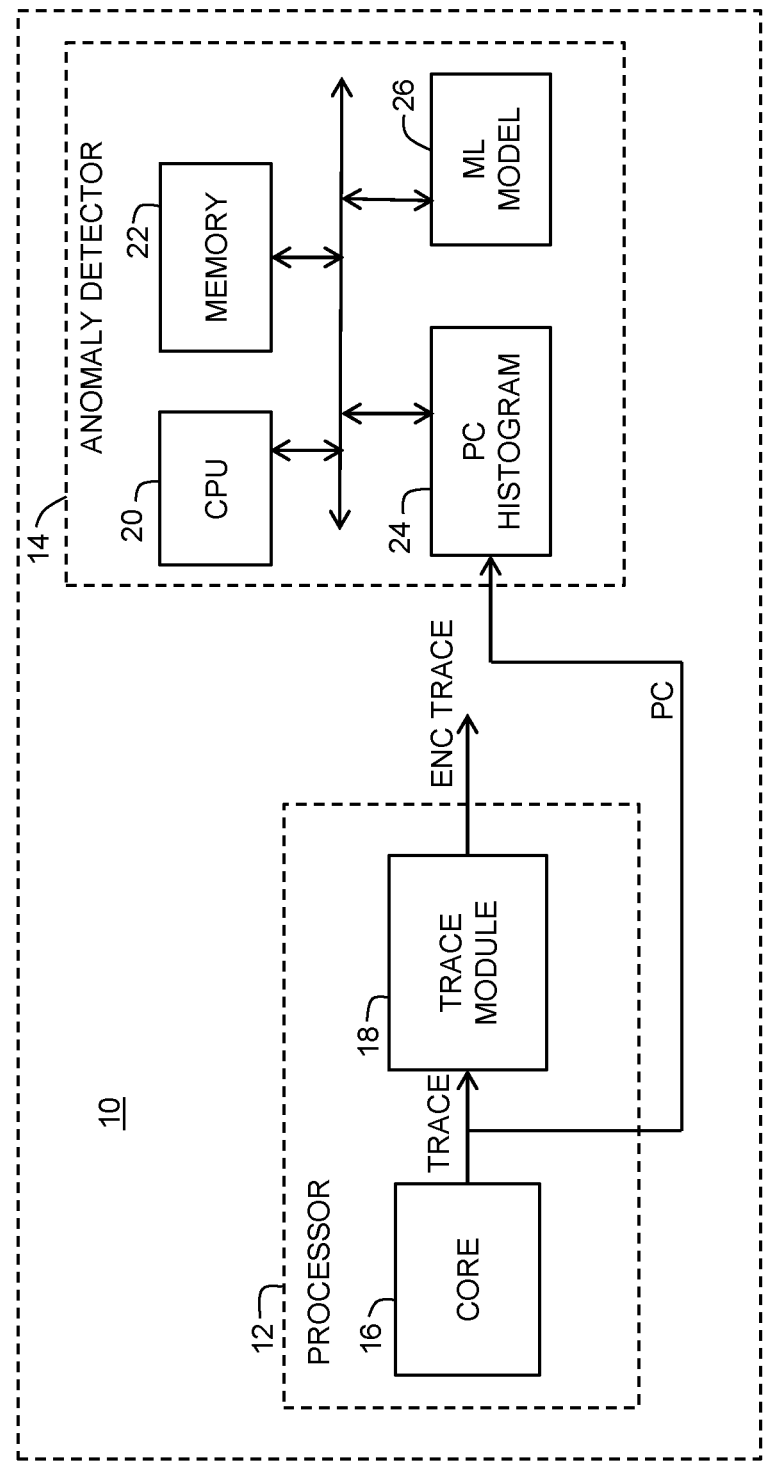
FIG. 1 illustrates a data processing system in accordance with an embodiment.

Generally, there is provided, a method and data processing system for detecting an anomaly in a processing core of the data processing system. The data processing system includes an anomaly detector. The anomaly detector uses a program counter (PC) histogram and a machine learning (ML) model to detect anomalous program execution in the processing core. In the method for detecting an anomaly, a plurality of PC values is received from the core during program execution. Each of the plurality of PC values correspond to an instruction being executed. The plurality of PC values is used to construct a histogram that corresponds to a predetermined time interval of instruction execution. The histogram includes a plurality of bins, where each of the pc values maps to a particular bin. A count of the PC values is maintained for each bin based on how many times the PC values were encountered during the predetermined time interval. Initially, during development and manufacturing of the data processing system, a plurality of the histograms is constructed and used as training data for training the ML model. After training, and during normal operation of the data processing system, the histograms are constructed and input to the ML model to detect when program execution deviates from normal program execution. The detected abnormal behavior may be caused by malfunctions or by an attack. Using a histogram of PC values as described provides an efficient and accurate way to detect the anomalies.

In accordance with an embodiment, there is provided, a method for detecting an anomaly in a data processing system, the method including: receiving a plurality of program counter (PC) values from the data processing system, each of the plurality of PC values corresponding to an instruction being executed in a processing core of the data processing system; constructing a histogram using the plurality of PC values; providing the histogram to a machine learning (ML) model; using the ML model, detecting an anomaly in the data processing system; and providing an indication of the anomaly. The histogram may correspond to a time interval of program execution of the processing core. The histogram may be used to train the ML model. Providing the histogram to a ML model may further include providing the histogram to the ML model during inference operation of the ML model. The ML model may include a support vector machine algorithm. The method may further include hashing the plurality of PC values and providing the hashed PC values to the histogram. Hashing the plurality of PC values may further include hashing a first plurality of least significant bits of a PC value with a second plurality of most significant bits of the PC value. The method may further include receiving the plurality of PC values through a tracing mechanism of a processing core of the data processing system. The tracing mechanism may further include applying a trace decoder to an encoded trace stream to retrieve a PC value.

In another embodiment, there is provided, a method for detecting an anomaly in a data processing system, the method including: receiving a plurality of program counter (PC) values from the data processing system, each of the plurality of PC values corresponding to an instruction being executed in a processing core of the data processing system; constructing a plurality of histograms using the plurality of PC values, wherein each of the plurality of histograms corresponding to a time interval of program execution of the processing core; providing the plurality of histograms to a machine learning (ML) model; using the ML model, detecting an anomaly in the data processing system; and providing an indication of the anomaly. Providing the plurality of histograms to the ML model may further include using the plurality of histograms to train the ML model. Providing the plurality of histograms to the ML model may further include providing the plurality of histograms to the ML model during inference operation of the ML model. The method may further include hashing the plurality of PC values prior to providing the histogram to the ML model. Hashing the plurality of PC values may further include hashing a first plurality of least significant bits of a program counter value with a second plurality of most significant bits of the program counter value. The method may further include receiving the plurality of PC values through a tracing mechanism of a processing core of the data processing system.

In yet another embodiment, there is provided, a data processing system, including: one or more processor cores for executing a program comprising a plurality of instructions; and an anomaly detector coupled to the one or more processor cores, the anomaly detector including: a program counter (PC) histogram block coupled to receive a plurality of PC values from the one or more processor cores, each of the plurality of PC values corresponding to an executed instruction, the PC histogram block for constructing a histogram using the plurality of PC values; a machine learning (ML) model coupled to receive the histogram from the PC histogram block, the ML model detecting an anomaly in the program using the histogram. The ML model may include a one-class support vector machine algorithm. The data processing system may further include the PC histogram block for constructing a plurality of histograms, each of the plurality of histograms corresponding to a time interval of program execution of the one or more processor cores. The data processing system may further include a program tracing mechanism, wherein the plurality of PC values is received through the program tracing mechanism. The data processing system may further include a trace decoder for decoding an encoded trace stream to retrieve a program counter value.

FIG. 1 illustrates a simplified embodiment of data processing system 10. Data processing system 10 includes processor 12 and anomaly detector 14. Processor 12 includes one or more processor cores, such as core 16, and trace module 18. Anomaly detector 14 includes central processor unit (CPU) 20, memory 22, PC histogram 24, and ML model 26. Data processing system 10 may be implemented on one or more integrated circuits and in one embodiment is characterized as being a System on a Chip (SoC). An SoC may include a number of subsystem functional blocks (not shown). For example, the functional blocks may be processors, various memory units (e.g., cache memory, RAM, ROM), hardware accelerators, access control units, etc. Processor 12 may be any hardware device capable of executing instructions stored in a memory (not shown). Processor 12 may be, for example, a microprocessor, field programmable gate array (FPGA), application-specific integrated circuit (ASIC), or similar device. Processor 12 may be implemented in a secure hardware element and may be tamper resistant.

Trace module 18 receives a program trace labeled TRACE from core 16. The trace may be used to log certain information about a program so that an analysis of the program instructions can be performed. The information may be used for debugging purposes. In one embodiment, trace module 18 is used to encode the trace and provide the encoded trace labeled "ENC TRACE" to a debugging environment (not shown). In some processors, a stream of trace information includes the PC values that can relatively easily retrieved from the trace. In the illustrated embodiment, the PC values are taken from the trace and provided directly to PC histogram 24 of anomaly detector 14. A Cortex-M7 processor by ARM is one example of a processor that provides the PC values as part of the trace information.

Program counter histogram 24 receives the program counter values from core 16 and uses the PC values to construct a histogram. If processor 12 includes more than one core, then a PC histogram is constructed for each core. Program counter histogram block 24 operates under the direction and control of CPU 20. In one embodiment, CPU 20 is another processor core like core 16. In another embodiment, CPU 20 may be a different type of processor. Memory 22 may be used for various purposes. For example, memory 22 may be used to store instructions and data for use by CPU 20. Also, memory 22 may be used to store the histograms constructed by PC histogram block 24. Memory 22 may be any kind of data or instruction memory, such as for example, L1, L2, or L3 cache or system memory. Memory 22 may include multiple separate memory blocks and may include blocks of different memory types. For example, memory 22 may include volatile memory such as static random-access memory (SRAM) or dynamic RAM (DRAM), or may include non-volatile memory such as flash memory, read only memory (ROM), or other volatile or non-volatile memory. Also, memory 22 may be implemented in a secure hardware element. Alternately, memory 22 may include a hard drive implemented externally to data processing system 10. Memory 22 may include one or more machine-readable storage media for storing instructions for execution by CPU 20.

In one embodiment, ML model 26 includes a support vector machine (SVM) algorithm. Also, the SVM may be characterized as being a one-class SVM. In another embodiment, ML model 26 may include a different algorithm, such as a neural network. A series of histograms are produced by PC histogram block 24. The method used to produce the histograms is used to produce histograms for both training and inference operation of ML model 26. During training of ML model 26, the series of histograms created by PC histogram block 24 is received during an operation of core 16 that is known to include only normal program execution. Machine learning model 26 is not trained with histograms of abnormal behavior. Also, if training of ML model 26 is accomplished during development or production of data processing system 10, a method for creating PC histogram 24 and the training of ML model 26 may be performed using a system separate from data processing system 10.

Figure 2:
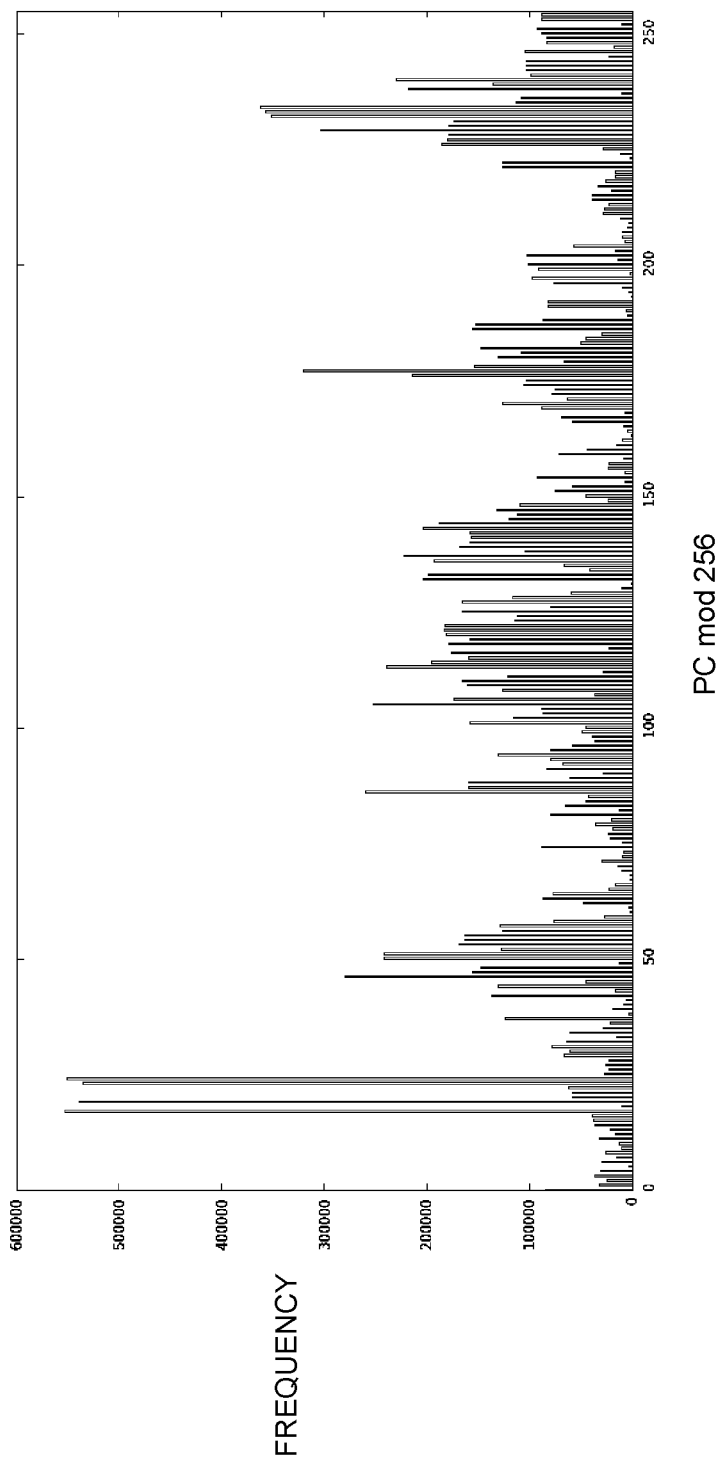
FIG. 2 illustrates one example of a program counter (PC) histogram for use in detecting anomalies in the data processing system of FIG. 1.

FIG. 2 illustrates one example of a PC histogram for use in detecting anomalies in the data processing system 10. To construct the PC histogram, N bits of each PC value corresponding to an instruction executed within a predetermined time interval is used, where N is an integer. The integer N may be all bits of a PC value or any number fewer than all bits. The histogram may include $2^N$ bins. Each bin includes a count of how many times the N bits of a PC value is encountered during the predetermined time interval. In the example histogram of FIG. 2, N is 8 indicating that 8 least significant bits of the PC value are used, and the histogram includes 256 bins as indicated along the x-axis in FIG. 2. The counter values for each of the bins is along the y-axis. In another embodiment, the number bits and the number of bins can be different. The predetermined time interval can be any interval and may depend at least partly on the processing speed of the processor and how many instructions are desired per histogram. For example, the predetermined time interval may be chosen to be long enough to allow the processing of 500,000 PC values. In another embodiment, the number of PC values may be different.

The histogram can be used for training ML model 26 or for inference operation, depending on when the histogram is provided to ML model 26. In one embodiment, during normal operation of data processing system 10, a new histogram is created periodically and provided to ML model 26. If ML model 26 detects an anomaly, an indication may be provided so that corrective action may be taken. In one embodiment, the indication may be a flag or a logic bit in a status register. In another embodiment, the indication may trigger an automatic response, such as shutting down the data processing system.

Figure 3:
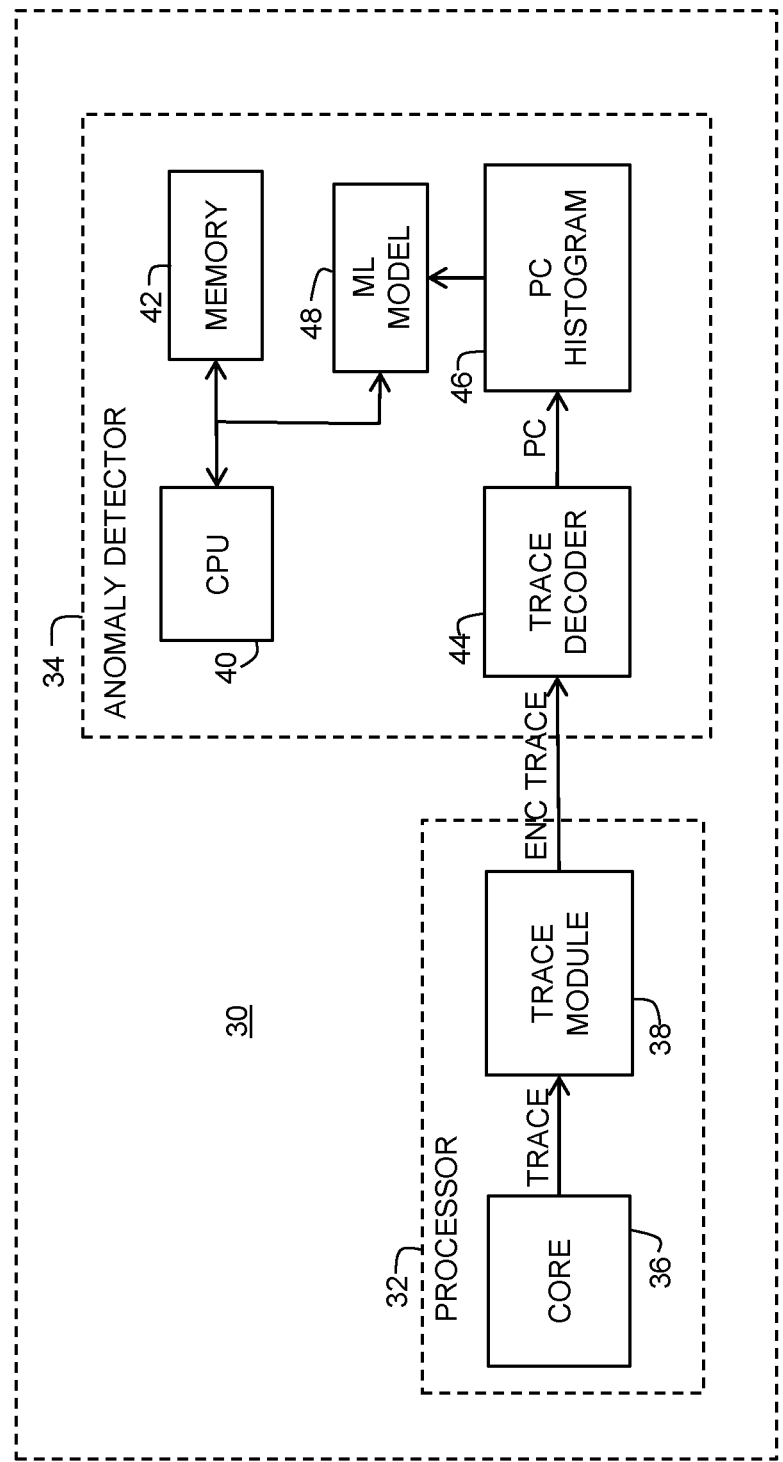
FIG. 3 illustrates a data processing system in accordance with another embodiment.

FIG. 3 illustrates data processing system 30 in accordance with another embodiment. Data processing system 30 includes processor 32 and anomaly detector 34. Processor 32 includes one or more processor cores 36 and trace module 38. Anomaly detector 34 includes CPU 40, memory 42, trace decoder 44, PC histogram block 46, and ML model 48. Other embodiments of anomaly detector 34 may be different. Data processing system 30 may be implemented on one or more integrated circuits and in one embodiment is characterized as being an SoC. The SoC may include any number of subsystem functional blocks (not shown). For example, the functional blocks may be processors, various memory units (e.g., cache memory, RAM, ROM), hardware accelerators, access control units, etc. Processor 32 may be any hardware device capable of executing instructions stored in a memory (not shown). Processor 32 may be, for example, a microprocessor, field programmable gate array (FPGA), application-specific integrated circuit (ASIC), or similar device. Processor 32 may have multiple processing cores. Processor 32 may be implemented in a secure hardware element and may be tamper resistant.

Trace module 38 receives a program trace labeled TRACE from core 16. Like the trace of FIG. 1, the trace from core 36 is used to log certain information about a program so that an analysis of the program instructions can be performed. The information may be used for debugging purposes. The trace is provided by processor core 36 to trace module 38. Trace module 38 encodes the trace and generates encoded trace "ENC TRACE." However, unlike the embodiment of FIG. 1, the trace from processor core 36 does not allow the PC values from program execution to be retrieved separately and used for construction of the histogram as was done in the embodiment of FIG. 1. The Cortex-A53 processor core by ARM is an example of processor that does not readily provide the PC values as a retrievable part of the trace. In the case of a processor like the ARM Cortex-A53, anomaly detector 34 includes trace decoder 44 for decoding the encoded trace and retrieving at least a subset of the PC values. There may be various ways to recover the PC values from processor core 36. The Cortex-A53 includes an embedded trace microcell (ETM) for encoding the trace. One way PC values may be retrieved from a processor like the ARM Cortex-A53 processor is to send a synchronization request to the ETM. In response to the synchronization request, the ETM will return a sync pattern. At the end of the sync pattern is an address element that includes a PC value. Only a subset of the executed PC values can be retrieved this way from the processor core, but it has been determined that the subset is large enough to produce a histogram having approximately the same shape as a histogram using all the executed PC values. Once the histogram is constructed for the predetermined time interval, the histogram is used as described above regarding the embodiments of FIG. 1 and FIG. 2.

Figure 4:
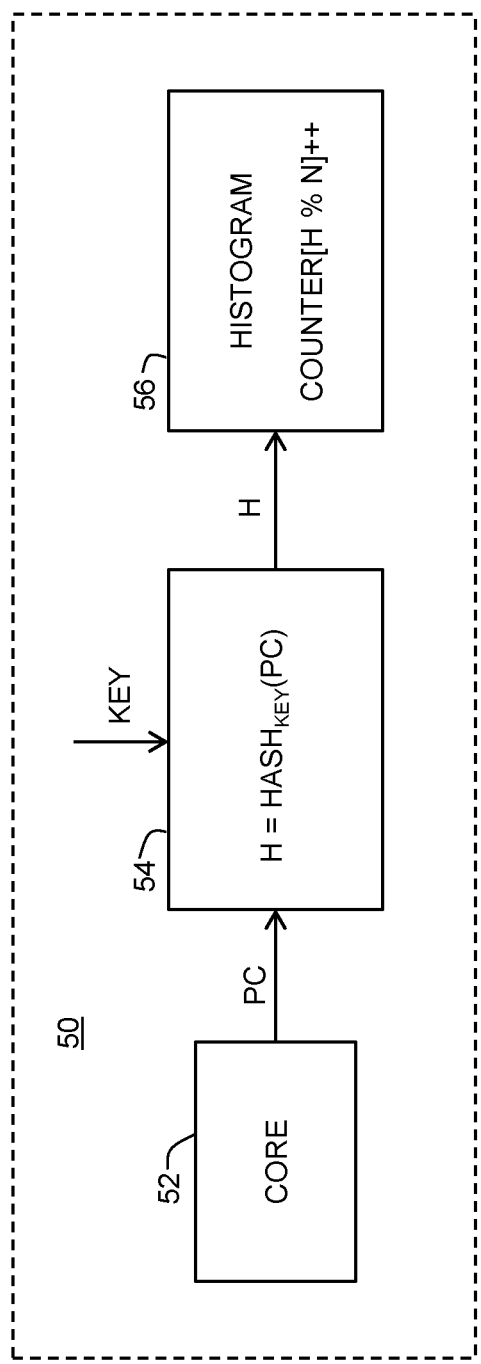
FIG. 4 illustrates an example of a histogram constructed using hashed program counter values.

FIG. 4 illustrates a simplified example of data processing system 50 having a histogram constructed using hashed PC values. Data processing system 50 includes a processor core 52, hashing block 54, and histogram block 56. In accordance with one embodiment, a plurality of PC values labeled PC is output from processor core 52. Hashing block 54 receives the plurality of PC values and a key labeled KEY. Using the key, hashing block 54 outputs a hash value H for each PC value of the plurality of PC values. The same key is used for both training and inference operation of the ML model. The hashed PC values are then provided to histogram block 56 and used to construct the histogram for use with the ML model. In histogram block 56, counters are used to bin each of the hashed PC values as indicated. In one embodiment, N least significant bits of the PC value are used to construct the histogram. Because the most significant bits are not used, in one embodiment, the N least significant bits of the PC values may be hashed with the most significant bits. Using a hash of the PC value to construct the histogram provides some security against an attacker that tries to hide the introduction of malicious code. Note that if address space layout randomization (ASLR) is used in the data processing system, only the page offset bits of the PC value can be used.

Figure 5:
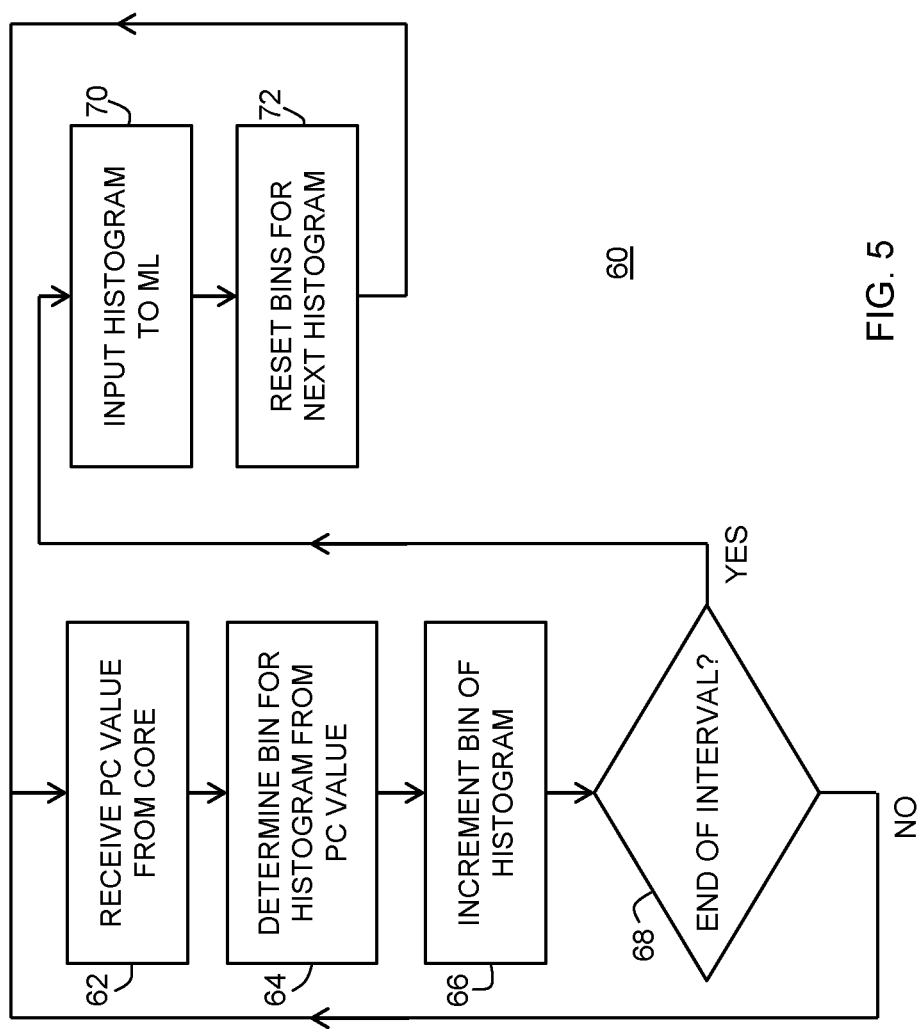
FIG. 5 illustrates a method for constructing a data set for detecting an anomaly in a data processing system using a machine learning model.

FIG. 5 illustrates method 60 for constructing a histogram for detecting an anomaly in a data processing system using a ML model. The histogram constructed from method 60 may be used for training an ML model or for inference operation. The time interval for retrieving PC values and the number of bits N for each PC value is set prior to receiving PC values. Method 60 begins at step 62. At step 62, a PC value is received from a processor core. The PC value may be retrieved from a trace directly as described above in the description of FIG. 1, or by using a trace decoder as described above regarding FIG. 3. At step 64, the PC value is assigned to one of a plurality of bins of the histogram. Each of the bins has a counter. Each time the PC value is encountered, the counter of the bin is incremented as stated at step 66. At decision step 68, it is determined if the end of the predetermined time interval has been reached. If the end of the predetermined time interval has not been reached, then the NO path is taken, and the method returns to step 62 and is repeated for another PC value. If the end of the predetermined time interval has been reached, the retrieval of PC values is complete for the histogram and the YES path is taken to step 70. At step 70, the completed histogram is provided to a ML model, either for training or for inference operation. At step 72, the counters for the bins are reset to begin construction of the next histogram and the method returns to step 62. If the ML model is already trained, method 60 continues in this way for as long as the data processing system is operating. Alternatively, during inference operation, method 60 may only operate in certain operating modes, in the background as shared processing resources allow, or periodically. If the ML model is being trained, then method 60 continues until training is complete.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting an anomaly in a data processing system, the method comprising:
receiving a plurality of program counter (PC) values from the data processing system,
each of the plurality of PC values corresponding to an instruction being executed in a processing core of the data processing system;
hashing the plurality of PC values
wherein hashing the plurality of PC values further comprises hashing a first plurality of least significant bits of a PC value with a second plurality of most significant bits of the PC value;
constructing a histogram using the hashed plurality of PC values;
providing the histogram to a machine learning (ML) model;
using the ML model, detecting an anomaly in the data processing system; and
executing an indication of the anomaly.

2. The method of claim 1, wherein the histogram corresponds to a time interval of program execution of the processing core.

3. The method of claim 1, wherein the histogram is used to train the ML model.

4. The method of claim 1, wherein providing the histogram to a ML model further comprises providing the histogram to the ML model during inference operation of the ML model.

5. The method of claim 1, wherein the ML model comprises a support vector machine algorithm.

6. The method of claim 1, further comprising receiving the plurality of PC values through a tracing mechanism of a processing core of the data processing system.

7. The method of claim 6, wherein the tracing mechanism further comprises applying a trace decoder to an encoded trace stream to retrieve a PC value.

8. A method for detecting an anomaly in a data processing system, the method comprising:
receiving a plurality of program counter (PC) values from the data processing system,
each of the plurality of PC values corresponding to an instruction being executed in a processing core of the data processing system;
hashing the plurality of PC values
wherein hashing the plurality of PC values further comprises hashing a first plurality of least significant bits of a PC value with a second plurality of most significant bits of the PC value;
constructing a plurality of histograms using the hashed plurality of PC values,
wherein each of the plurality of histograms corresponding to a time interval of program execution of the processing core;
providing the plurality of histograms to a machine learning (ML) model;
using the ML model, detecting an anomaly in the data processing system; and
executing an indication of the anomaly.

9. The method of claim 8, wherein providing the plurality of histograms to the ML model further comprises using the plurality of histograms to train the ML model.

10. The method of claim 8, wherein providing the plurality of histograms to the ML model further comprises providing the plurality of histograms to the ML model during inference operation of the ML model.

11. The method of claim 8, further comprising receiving the plurality of PC values through a tracing mechanism of a processing core of the data processing system.

12. A data processing system, comprising:
one or more processor cores for executing a program comprising a plurality of instructions; and
an anomaly detector coupled to the one or more processor cores, the anomaly detector comprising:
a hashing block configured to hash a plurality of program counter (PC) values from the one or more processor cores, wherein each of the hashed plurality of PC values corresponding to an executed instruction, and wherein hashing the plurality of PC values comprises hashing a first plurality of least significant bits of a PC value with a second plurality of most significant bits of the PC value,
a PC histogram block coupled to receive the hashed plurality of PC values, the PC histogram block for constructing a histogram using the hashed plurality of PC values;
a machine learning (ML) model coupled to receive the histogram from the PC histogram block, the ML model detecting an anomaly in the program using the histogram.

13. The data processing system of claim 12, wherein the ML model comprises a one-class support vector machine algorithm.

14. The data processing system of claim 12, further comprising a plurality of histograms, each of the plurality of histograms corresponding to a time interval of program execution of the one or more processor cores.

15. The data processing system of claim 12, further comprising a program tracing mechanism, wherein the plurality of PC values is received through the program tracing mechanism.

16. The data processing system of claim 15, further comprising a trace decoder for decoding an encoded trace stream to retrieve a program counter value.

* * * * *